United States Patent
Bilinski et al.

(10) Patent No.: US 9,183,003 B2
(45) Date of Patent: Nov. 10, 2015

(54) MODE NOTIFICATIONS

(75) Inventors: Brandon Bilinski, San Francisco, CA (US); Owen Otto, Oakland, CA (US)

(73) Assignee: GOOGLE INC., Mountain View, CA (US)

( * ) Notice: Subject to any disclaimer, the term of this patent is extended or adjusted under 35 U.S.C. 154(b) by 1079 days.

(21) Appl. No.: 13/191,883

(22) Filed: Jul. 27, 2011

(65) Prior Publication Data

US 2013/0031477 A1 Jan. 31, 2013

(51) Int. Cl.
*G06F 3/00* (2006.01)
*G06F 3/048* (2013.01)
*G06F 9/44* (2006.01)
*G06F 3/16* (2006.01)

(52) U.S. Cl.
CPC .................................. *G06F 9/4443* (2013.01)

(58) Field of Classification Search
None
See application file for complete search history.

(56) References Cited

U.S. PATENT DOCUMENTS

| | | | | |
|---|---|---|---|---|
| 5,986,200 A | * | 11/1999 | Curtin | 84/609 |
| 6,664,970 B1 | * | 12/2003 | Matsushita | 345/581 |
| 7,735,104 B2 | * | 6/2010 | Dow et al. | 725/52 |
| 8,352,543 B2 | * | 1/2013 | Krikorian et al. | 709/203 |
| 8,443,038 B2 | * | 5/2013 | Robbin et al. | 709/203 |
| 8,656,043 B1 | * | 2/2014 | Wieder | 709/231 |
| 8,700,739 B2 | * | 4/2014 | Khedouri et al. | 709/219 |
| 2001/0018858 A1 | * | 9/2001 | Dwek | 84/609 |
| 2004/0131333 A1 | * | 7/2004 | Fung et al. | 386/69 |
| 2005/0149872 A1 | * | 7/2005 | Fong et al. | 715/727 |
| 2007/0220052 A1 | * | 9/2007 | Kudo et al. | 707/104.1 |
| 2008/0278441 A1 | * | 11/2008 | Larsen | 345/156 |
| 2010/0060586 A1 | * | 3/2010 | Pisula et al. | 345/169 |
| 2010/0328224 A1 | * | 12/2010 | Kerr et al. | 345/173 |
| 2011/0182441 A1 | * | 7/2011 | Coffman et al. | 381/107 |
| 2011/0202842 A1 | * | 8/2011 | Weatherly et al. | 715/716 |
| 2012/0221951 A1 | * | 8/2012 | Kidron | 715/716 |
| 2014/0089799 A1 | * | 3/2014 | Evans | 715/716 |

OTHER PUBLICATIONS

International Search Report and Written Opinion, mailed Oct. 9, 2012, in counterpart International Patent Application No. PCT/US2012/048052, 10 pages.

Sony Corporation, "Sony Walkman—Operation Guide—NWZ-E343/E344/E345", Dec. 31, 2009, XP002683696, Retrieved from the Internet on Sep. 19, 2012: URL:http//www.docs.sony.com/release/NWZE344_EN.pdf, 119 pages.

* cited by examiner

*Primary Examiner* — Yongjia Pan
(74) *Attorney, Agent, or Firm* — Morris & Kamlay LLP

(57) ABSTRACT

In general, a method performed on one or more computing systems includes receiving an indication that a control that affects an application has been activated, identifying, by the one or more computing systems in response to the indication, one or more active modes of the application that are not influenced by the control, and providing, on a display in response to identifying the one or more active modes, a graphical representation of the one or more active modes.

16 Claims, 7 Drawing Sheets

MODE NOTIFICATIONS

In general, this specification relates to mode notifications.

BACKGROUND

Electronic storage devices can be used to store information in the form of files. Users or applications can access files stored on storage devices in order to interact with the information stored in the file. In some cases, applications that interact with the information stored in the file may have one or more modes of operation that may be active or inactive.

SUMMARY

In general, in one aspect, a method performed on one or more computing systems includes receiving an indication that a control that affects an application has been activated, identifying, by the one or more computing systems in response to the indication, one or more active modes of the application that are not influenced by the control, and providing, on a display in response to identifying the one or more active modes, a graphical representation of the one or more active modes.

Aspects may include none, one, or more of the following features. The control cannot be activated to alter the one or more active modes of the application. The application comprises a media player application. The one or more modes comprise one or more of a shuffle mode, a repeat one mode, a repeat all mode, and a mute mode. The control affects the playback of a media file. The media files comprises one or more of a music file, a video file, and an image file. The control comprises one or more of a play control, a next track control, and a previous track control. The graphical representation comprises a symbol associated with the one or more active modes that overlays at least a portion of the display. Receiving the indication comprises receiving the indication when the application does not have a focus of the one or more computing systems. Providing the graphical representation comprises providing a symbol that overlays one or more applications that have the focus of the one or more computing systems. The control comprises a browser control provided outside of the application or a physical control on a physical keyboard. The browser control comprises a toolbar embedded in a web browser. The graphical representation is removed from the display after one or more predetermined conditions are satisfied. The one or more predetermined conditions comprise one or more of determining that a predetermined period of time has elapsed, receiving an instruction from a user to remove the graphical representation, and determining that the one or more active modes have changed. The graphical representation is associated with information that can be presented by a screen reader.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Briefly, techniques are disclosed for determining whether an application includes, or is operating in, one or more active modes, and providing an indication of any identified active modes to a user. For example, some applications (e.g., a digital media player, such as a music player) can playback files of a particular type (e.g., a music player can play back audio files). In the example of a music player, the music player may include a number of modes which may operate in an active or an inactive state. For example, a music player may include modes such as a shuffle mode (which causes a group of audio files to be played in a random or pseudo-random order), a mute mode (in which sound from the music player is suppressed), a repeat mode (in which a playback sequence of audio files is repeated), and a repeat one mode (in which the playback of a single audio file is repeated).

In some examples, file playback applications such as music players can detect one or more modes operating in an active state, and may provide a notification to a user that the mode(s) is/are active. Activation of controls which do not influence the modes of operation may trigger the detection and notification of the active modes. For example, if a user of a music player inputs a play command (e.g., to initiate the playback of an audio file), the music player may, in response to the play command, determine whether any of its modes are active. If the music player determines that one or more of its modes are active (e.g., if the music player determines that the shuffle mode is active), the music player may generate a notification (e.g., a visual or audio notification) to alert the user that the shuffle mode is active. Providing notifications of active modes to users may alleviate the undesirable or confusing results caused by, for example, a user who activates a mode of the music player and later forgets that the mode is turned on.

Figure 1:
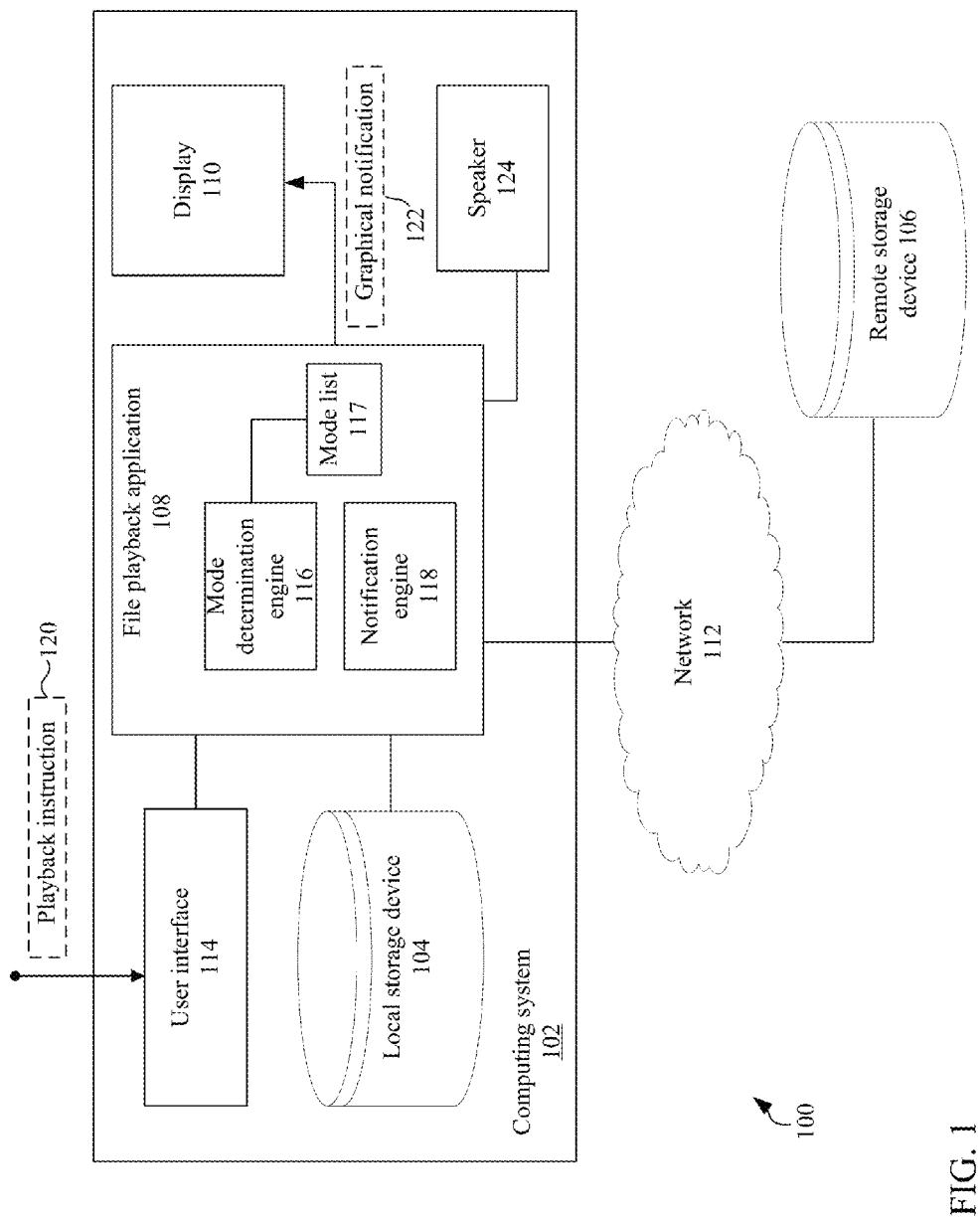
FIG. 1 is a diagram of a computing system in accordance with an embodiment.

FIG. 1 illustrates an example of a system 100 that includes a computing system 102 (e.g., a personal computer or a mobile device, such as a smart phone) that includes a local storage device 104 (e.g., internal memory, such as an internal hard drive or a local solid state storage device). The computing system 102 communicates over a network 112 (e.g., the Internet and/or one or more additional local area networks (LANs) or wide area networks (WANs)) with a remote storage device 106. In some examples, the remote storage device 106 can be referred to as "cloud storage" or simply "the cloud." One or both of the computing system 102 and the remote storage device 106 may include one or more storage devices, such as a server with multiple hard drives or a cluster of servers.

The local storage device 104 and the remote storage device 106 are capable of storing a variety of files in a variety of formats. For example, the storage devices 104, 106 can store files and data including audio files (e.g., songs), image files (e.g., pictures), video files (e.g., movie clips), and/or any other suitable file type.

The computing device 102 may include one or more applications that can be executed to access, view, modify, or otherwise interact with the files stored on both the local storage device 104 and the remote storage device 106. For example, the computing system 102 may run a file playback application 108 (e.g., a music player) which may include a mode determination engine 116 and a notification engine 118. Possible user interfaces that correspond to the file playback application 108 (or to other similar applications) are shown in the examples of FIGS. 2-5.

In general, the file playback application 108 may allow a user to interact (e.g., via a user interface 114) with one or more files stored on the local storage device 104 or the remote storage device 106. For example, if the file playback application 108 were a music player, a user of the computing system 102 could provide instructions to the file playback application 108 via the user interface 114 in order to play audio content stored on the local storage device 104 or the remote storage device 106. The file playback application 108 can provide visual output (e.g., images) to a display 110 and may also provide audio output (e.g., audible music associated with the played audio file) to a speaker 124.

The system 100 may implement mode identification and notification techniques as described above and below. For example, in the example of FIG. 1, user interface 114 has received a playback instruction 120. For example, a user may provide the playback instruction 120 in order to cause the file playback application 108 to play an audio file stored on the remote storage device 106. The playback instruction 120 can be generated, for example, by a user activating a control associated with an interface of the file playback application 108 (e.g., a graphical control that can be clicked with a mouse), or can be generated in response to the activation of a control which has non-exclusive association with the file playback application 108 (e.g., media control buttons on a keyboard). The playback instruction 120 can also be generated in response to the activation of a control associated with an application other than the file playback application 108 (e.g., if the file playback application 108 is a web-based playback application, a control that is part of a toolbar embedded in an Internet browser may control operations within a "tab" or "window" that contains the file playback application). The playback instruction 120 may specify the file that the user wishes to play (e.g., by providing one or more of a file name, a file location, or other file characteristics).

In some examples, the playback instruction 120 is generated in response to the activation of a control which does not influence any of the playback modes. For example, the playback instruction 120 can be generated in response to a user activation of a "play" control on music player (see, e.g., the play/pause control 220 in FIGS. 2-5). In some examples, although the play control might not influence whether one or more of a mute mode, a repeat mode, a repeat one mode, or a shuffle mode is active or inactive, activation of the play control may cause the generation of a playback instruction 120 that will ultimately cause a notification to be provided that is associated with one or more of those modes.

The user interface 114 transmits the playback instruction 120 to the file playback application 108 in order to play the file(s) specified in the playback instruction 120. In some examples, the user interface 114 modifies, translates, or generates instructions based on the playback instruction 120 prior to transmitting the playback instruction 120 to the file playback application 108. That is, we use the term "playback instruction" (such as the playback instruction 120) broadly to include instructions which specify one or more tasks to be carried out by the computing system 102 (e.g., by the file playback application 108 and its associated engines).

In response to receiving the playback instruction 120 (or an instruction associated with the playback instruction 120), the file playback application 108 may determine whether the user should be notified of any active modes associated with the file playback application 108. For example, if the file playback application 108 is a music player, a mode determination engine 116 associated with the file playback application 108 may determine whether one or more modes are active, such as a shuffle mode, a repeat mode, a repeat one mode, or a mute mode.

In some examples, the mode determination engine 116 determines whether any modes are active based on an attribute of the playback instruction 120. For example, if the playback instruction 120 is a "play" instruction or a "next file/track" instruction (as opposed to, for example, an instruction stemming from the file playback application automatically progressing to the next file in a list of files to be played), the mode determination engine 116 may determine whether one or more modes are active. Limiting the playback instructions which will trigger a mode determination may prevent the file playback application 108 from inundating users with repetitive and unwanted notifications.

In some examples, the mode determination engine 116 may have access to a list of modes (e.g., the mode list 117) that specifies modes which, if found to be active on the file playback application 108, should trigger a notification. The mode list 117 can be stored, for example, in association with the file playback application 108 and may be customized by a user. For example, a user may specify which modes should trigger notifications if found to be active on the file playback application 108 by the mode determination engine 116. Similarly, a user may also specify which playback instructions will trigger mode determinations and/or notifications.

If the mode determination engine 116 determines that one or more modes are active, a notification engine 118 associated with the file playback application 108 may generate a graphical notification 122 to be presented on the display 110 (examples of which are shown in FIGS. 2-5). The graphical notification 122 can be presented on the display 110 within a window displaying the file playback application 108, or may be provided as a graphical overlay or pop-up icon, even if the file playback application 108 does not have a focus of the computing system 102 (e.g., if the file playback application 108 is minimized, or if another application is active or is at the forefront of the display 110). In some examples, the graphical notification 122 may include information which can be recognized by screen readers (e.g., devices for visually-impaired users) so that audible or braille-based notifications can be generated based on the graphical notification 122. In some examples, the notification engine 118 may provide an audible notification that corresponds to the graphical notification 122 to the speaker 124 directly.

Figure 2:
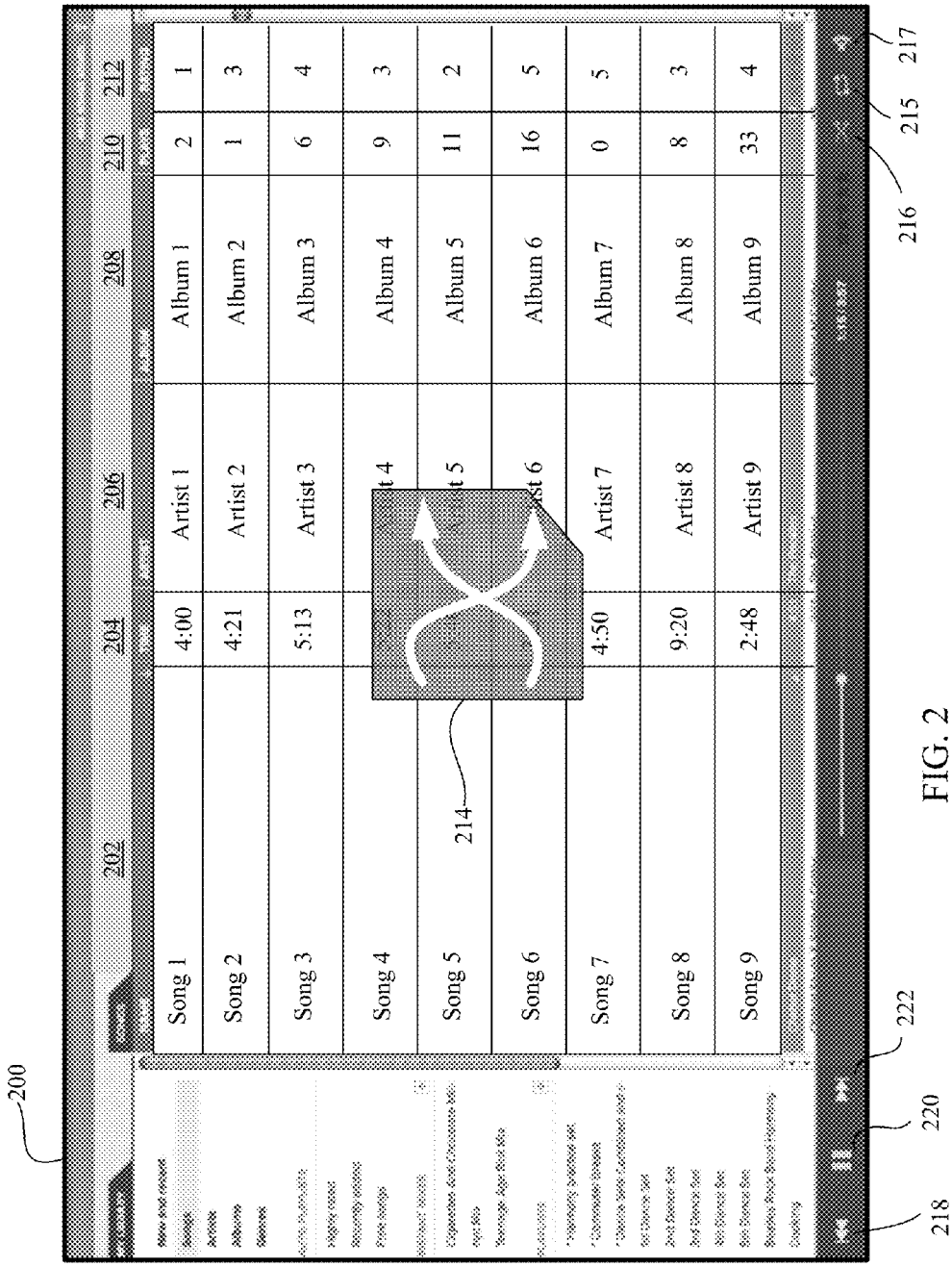
FIGS. 2-5 are diagrams of user interfaces in accordance with various embodiments.

FIG. 2 illustrates a possible user interface 200 of the file playback application 108. In this example, the file playback application 108 is a music player; however, similar user interfaces could be provided in situations in which the file playback application 108 is a video player, an image viewer, or an electronic book reader. The user interface 200 lists audio files (sometimes referred to as songs) available to be played, and provides columns that specify attributes of each audio file. Using the first audio file entry as an example, a title column 202 specifies a title of the audio file (e.g., Song 1), a length of the audio file (e.g., four minutes), an artist associated with the audio file (e.g., Artist 1), an album associated with the audio file (e.g., Album 1), a number of times the audio file has been played (e.g., two plays), and a rating associated with the audio file (e.g., a rating of "1" on a scale of 1-5).

The user interface 200 also includes controls for controlling the playback of an audio file. For example, the interface 200 includes a previous track control 218 (e.g., for causing the file playback application 108 to return to a previously-played audio file), a play/pause control 220 (e.g., for playing or pausing the playback of an audio file), and a next track control 222 (e.g., for causing the file playback application 108 to progress to the next audio file scheduled for playback).

The interface 200 also includes three mode controls: a shuffle control 216, a repeat control 215, and a mute control 217. The shuffle control 216 may, when activated, cause the file playback application 108 to schedule a group of audio files to be played in a random or pseudo-random order. The mute control 218 may, when activated, cause sound output associated with the file playback manager 108 to be suppressed. The repeat control 215 may, when activated, control two modes of the file playback application 108: the repeat mode (in which a playback sequence of audio files is repeated), and a repeat one mode (in which the playback of a single audio file is repeated). The different modes controlled by the repeat control 215 can be toggled by activating the repeat control 215 multiple times (e.g., one activation may trigger repeat mode, and two activations may trigger repeat one mode). The controls 216, 217, 218 may also display the status (e.g., active/inactive) of their associated modes. In this example, the shuffle control 216 indicates that only the shuffle mode is active.

In the example of FIG. 2, the user interface 200 displays a shuffle notification 214. In this example, the shuffle notification 214 is a graphical icon that includes a symbol representative of the shuffle mode (e.g., a symbol the bears some resemblance to the symbol associated with the shuffle control 216). The shuffle notification 214 may appear, for example, as a result of a user activation of the play/pause control 220, or the next track control 222. The shuffle notification may be configured to disappear from the user interface 200 after one or more predetermined conditions are met. For example, the shuffle notification 214 may disappear (e.g., fade, dissolve, or disappear with some other graphical effect) from view after a predetermined length of time has elapsed, in response to a user command, or after a mode has been changed (e.g., after the shuffle mode has been made inactive). The shuffle notification 214 may be partially transparent, and may be configured not to interrupt user activity. For example, a user may be allowed to continue manipulating the file playback application 108 or other applications while the shuffle notification is being presented.

Figure 3:
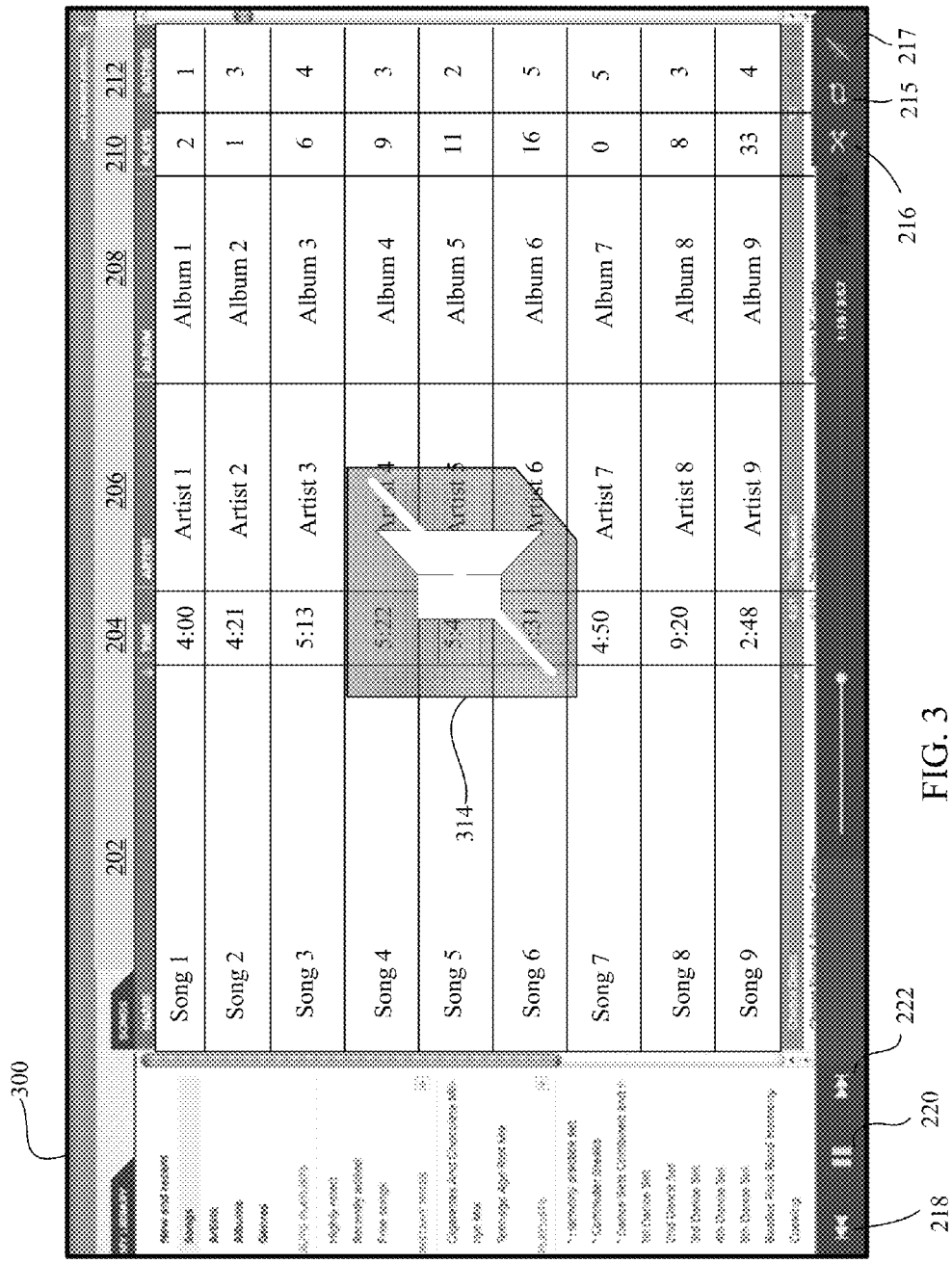

FIG. 3 illustrates a possible user interface 300 of the file playback application 108. The user interface 300 includes many of the same features and controls of the user interface 200. Instead of the shuffle notification 214, however, the user interface 300 includes a mute notification 314 that indicates that the mute mode is active. In the user interface 300, the mute control 217 also indicates that the mute mode is active.

Figure 4:
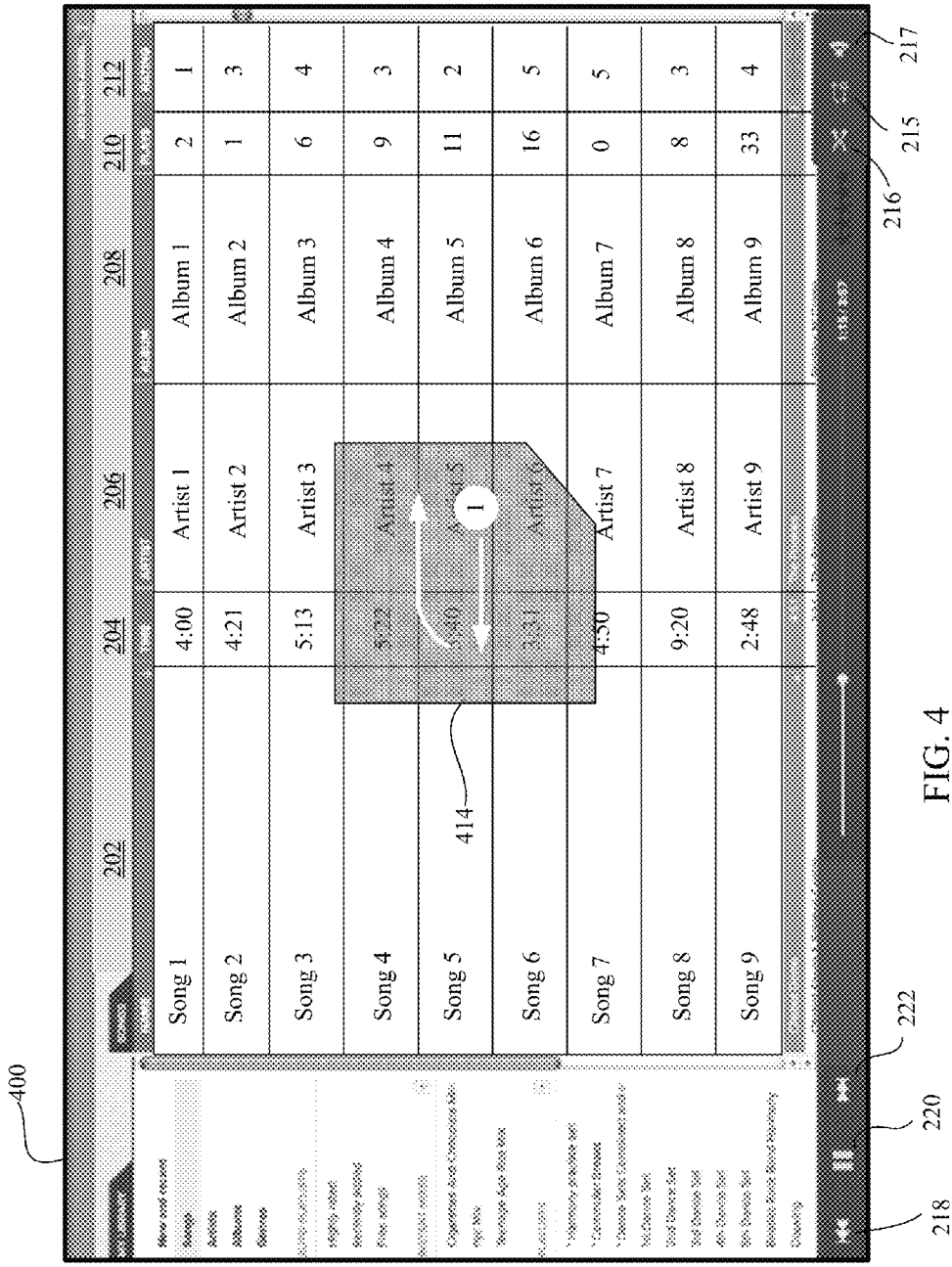

FIG. 4 illustrates a possible user interface 400 of the file playback application 108. The user interface 400 includes many of the same features and controls of the user interface 200. Instead of the shuffle notification 214, however, the user interface 400 includes a repeat one notification 414 that indicates that the repeat one mode is active. In the user interface 400, the repeat control 215 also indicates that the repeat one mode is active.

Figure 5:
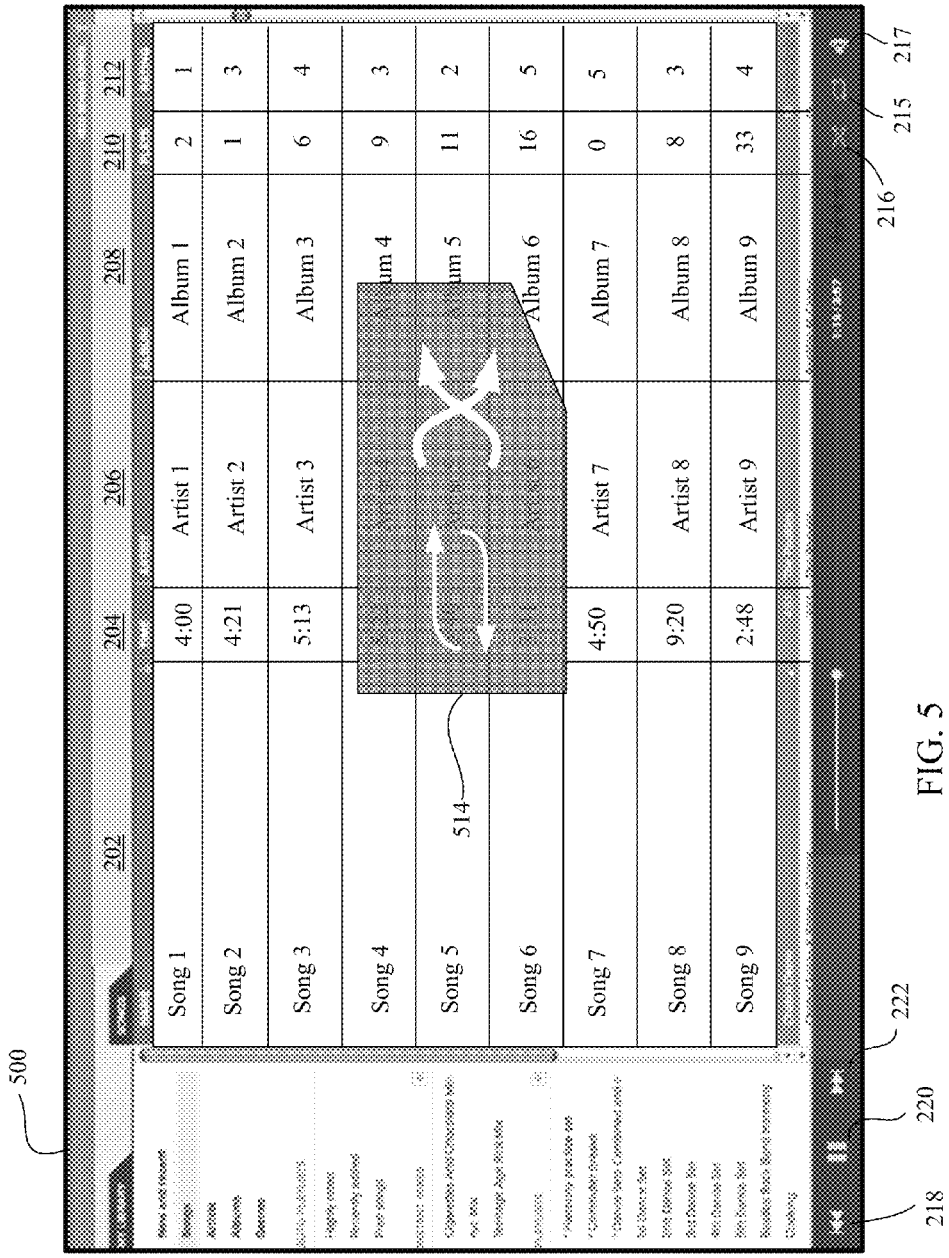

FIG. 5 illustrates a possible user interface 500 of the file playback application 108. The user interface 500 includes many of the same features and controls of the user interface 200. Instead of the shuffle notification 214, however, the user interface 500 includes a combined notification 514 that indicates that both the repeat mode and the shuffle mode are active. In the user interface 500, the shuffle control 215 and the repeat control 215 also indicate that the shuffle mode and the repeat mode are active. Notifications such as the combined notification 514 may specify any number of active modes.

Figure 6:
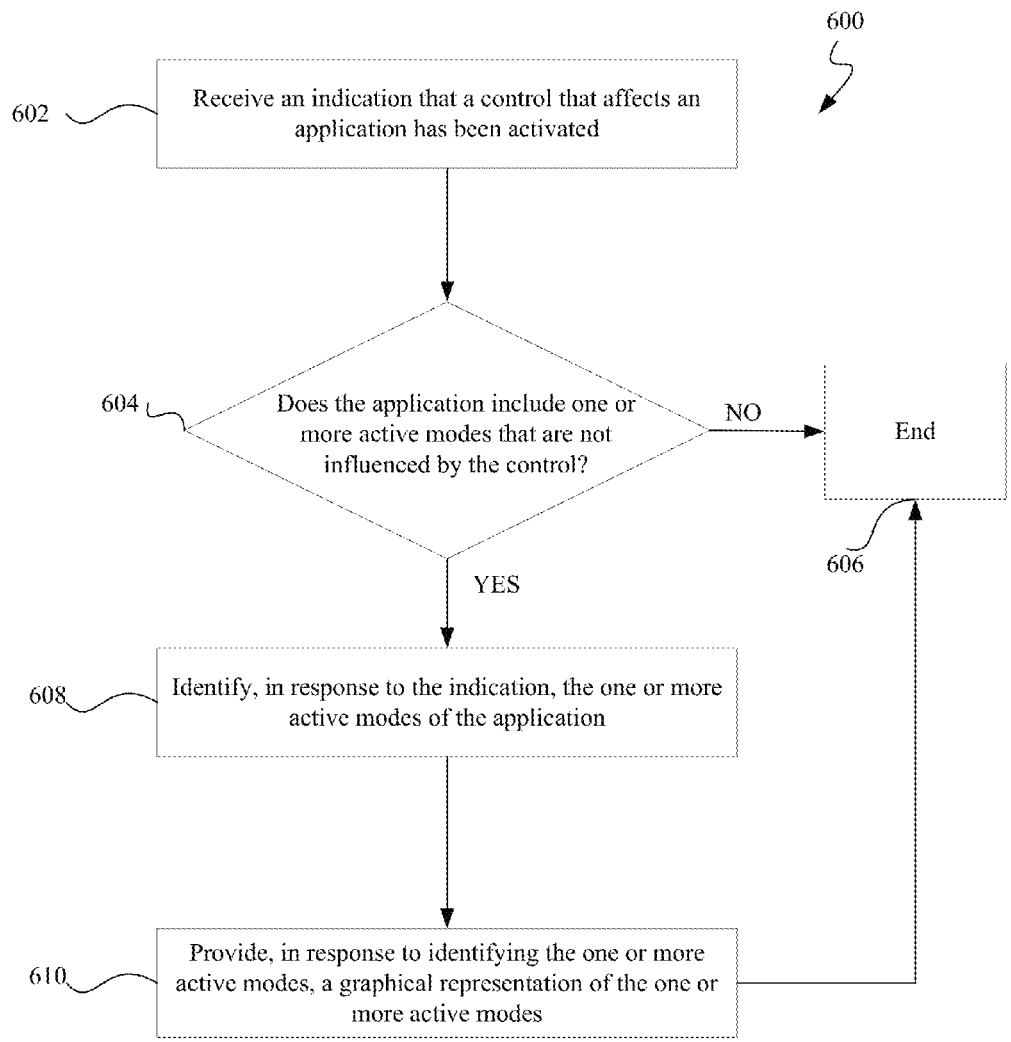
FIG. 6 is a diagram of a flow chart of a process in accordance with an embodiment.

FIG. 6 shows a process 600 for providing a notification. In this example, the process 600 will be described as if the file playback application 600 is a music player. An indication is received that a control that affects an application has been activated (602). For example, the file playback application 108 may receive an indication that a user has activated a play control (e.g., the play/pause control 220 shown in FIGS. 2-5). The file playback application 108 may determine whether the control associated with the indication is of a predetermined type (e.g., by comparing the control associated with the indication to a list of controls for which further action should be taken).

It is determined whether the application includes one or more active modes that are not influenced by the control (604). For example, the mode determination engine 116 may have access to a list of modes (e.g., the mode list 117) that specifies modes which, if found to be active on the file playback application 108, should trigger a notification. The mode list 117 can be stored, for example, in association with the file playback application 108 and may be customized by a user. For example, a user may specify which modes should trigger notifications if found to be active on the file playback application 108 by the mode determination engine 116. Similarly, a user may also specify which playback instructions will trigger mode determinations and/or notifications. In some examples, the modes within the most list 117 are not influenced by the control associated with the indication. For example, if the file playback application receives an indication that a play control has been activated, a notification may be generated and provided, as the play control does not influence the active/inactive status of a mute mode, a shuffle mode, a repeat mode, or a repeat one mode. Stated differently, in some examples, a control may trigger a notification even if that control cannot be activated to alter the one or more modes of the application.

If it is determined that the application does not include one or more active modes (NO), the process 600 ends 606, and no notification is provided. If it is determined that the application does include one or more active modes (YES), the one or more active modes of the application are identified (608). For example, the file playback application 108 may determine that a shuffle mode is active in response to receiving an indication that a play control has been activated.

In response to identifying the one or more active modes, a graphical representation of the one or more active modes is provided (610). For example, a graphical representation of a notification may be provided on a display to alert a user of the one or more active nodes. For example, if the file playback application 108 determines that a shuffle mode is active, a graphical representation that resembles the notification 214 (FIG. 2) can be provided to alert a user that the shuffle mode is active.

While in some examples the generation and presentation of notifications has been described as being controlled by hardware and/or software on a single and/or local computing system (e.g., the computing system 102), at least some of the techniques described above can be carried out by one or more other devices. For example, in FIG. 1, a network device connected to the computing system 102 via the network 112 may control one or more aspects of file playback, notification generation, or some of the other techniques described above.

While many of the examples provided above describe the file playback application as a music player, similar techniques can be used for the playback of other file types. For example, if the file playback application is an image viewer, notifications can be generated to inform users about settings that govern the time period between viewed images (e.g., images displayed in a slideshow within the image viewer). If the file playback application is an electronic book reader, notifications could be generated to inform a user about screen contrast settings (e.g., upon startup of the electronic book reader), or audio settings (e.g., an active/inactive state of the mute setting). In some examples, notifications can be generated that relate to a quality of an audio, video, image, or other file type. For example, a notification could be generated and presented to a user that indicates that an audio/video/image playback application is set to playback files at a low quality setting, a high-definition (HD) setting, or may provide an indication of a quality of the actual file being played back (e.g., 128 kbps for an audio file).

Figure 7:
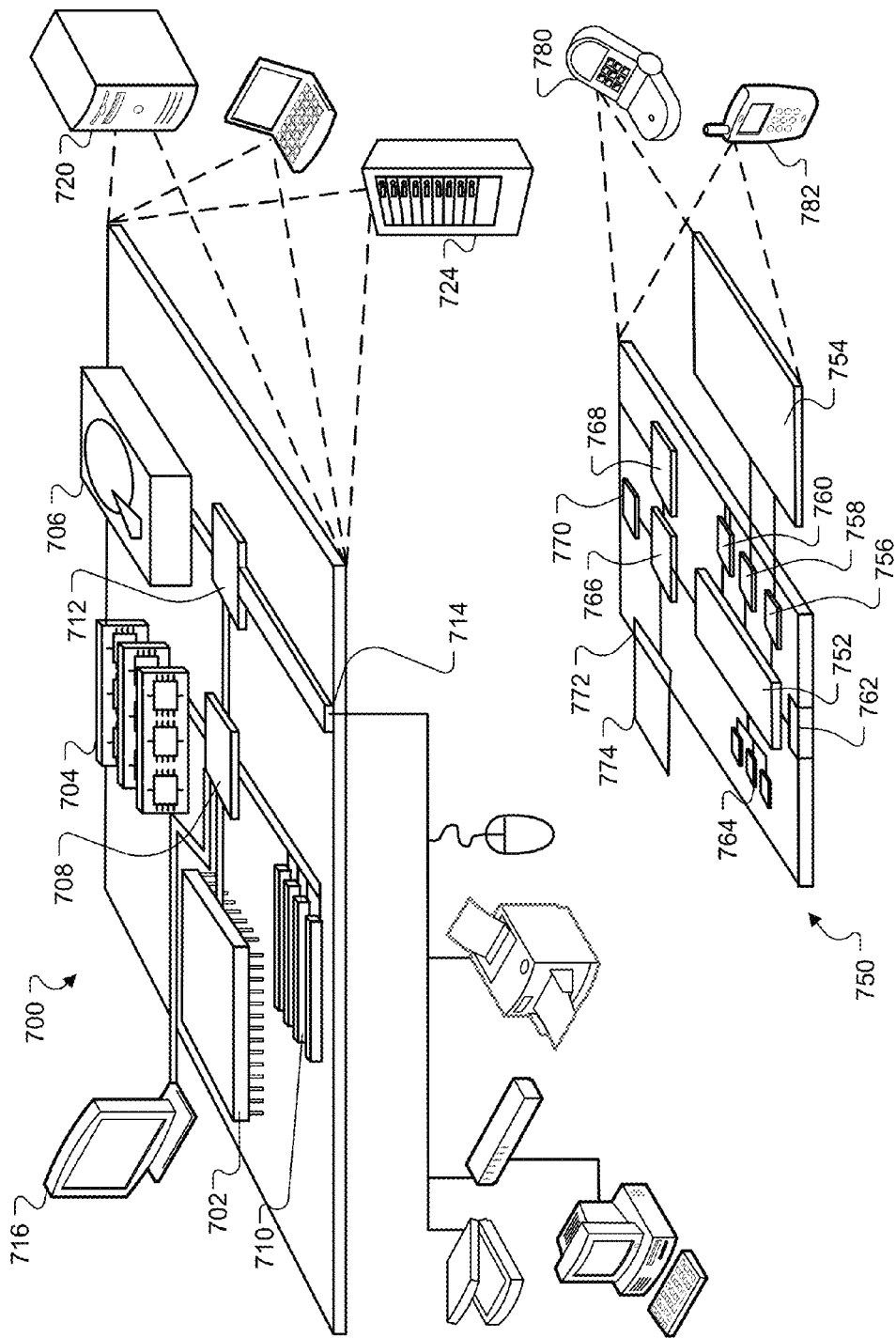
FIG. 7 is a diagram of a computing system.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a microdrive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method performed on one or more computing systems, the method comprising:
receiving an input from a user, the input specifying that a media playback instruction of a media player application triggers at least one of a mode determination and a notification, where the notification is triggered even when the media playback instruction cannot be activated to alter one or more active modes of the media player application, the one or more modes including one or more of a shuffle mode, a repeat one mode, a repeat all mode, and a mute mode;
receiving an indication that the media playback instruction that affects the media player application has been activated;
identifying, by the one or more computing systems in response to the indication, one or more active modes of the media player application that are not influenced by the media playback instruction; and
providing, on a display in response to identifying the one or more active modes, a combined notification in a graphical representation that at least two of the one or more active modes are active.

2. The method of claim 1, wherein the media playback instruction cannot be activated to alter the one or more active modes of the media player application.

3. The method of claim 1, wherein the media playback instruction affects the playback of a media file.

4. The method of claim 3, wherein the media files comprises one or more of a music file, a video file, and an image file.

5. The method of claim 3, wherein the media playback instruction comprises one or more of a play control, a next track control, and a previous track control.

6. The method of claim 1, wherein the graphical representation comprises a symbol associated with the one or more active modes that overlays at least a portion of the display.

7. The method of claim 1, wherein receiving the indication comprises receiving the indication when the media player application does not have a focus of the one or more computing systems.

8. The method of claim 7, wherein providing the graphical representation comprises providing a symbol that overlays one or more applications that have the focus of the one or more computing systems.

9. The method of claim 7, wherein the control comprises a browser control provided outside of the media player application or a physical control on a physical keyboard.

10. The method of claim 9, wherein the browser control comprises a toolbar embedded in a web browser.

11. The method of claim 1, further comprising removing the graphical representation from the display after one or more predetermined conditions are satisfied.

12. The method of claim 11, wherein the one or more predetermined conditions comprise one or more of:
determining that a predetermined period of time has elapsed;
receiving an instruction from a user to remove the graphical representation; and
determining that the one or more active modes have changed.

13. The method of claim 1, wherein the graphical representation is associated with information that can be presented by a screen reader.

14. The method of claim 1, wherein the input from the user specifies which modes trigger notifications when active on the media file playback application.

15. One or more non-transitory computer storage devices comprising instructions that, in response to execution by one or more processing devices, cause the one or more processing devices to perform operations comprising:
receiving an input from a user, the input specifying that a media playback instruction of a media player application triggers at least one of a mode determination and a notification, where the notification is triggered even when the media playback instruction cannot be activated to alter one or more active modes of the media player application, the one or more modes including one or more of a shuffle mode, a repeat one mode, a repeat all mode, and a mute mode;
receiving an indication that the media playback instruction that affects the media player application has been activated;
identifying, by the one or more computing systems in response to the indication, one or more active modes of the application that are not influenced by the media playback instruction; and
providing, on a display in response to identifying the one or more active modes, a combined notification in a graphical representation that at least two of the one or more active modes are active.

16. A system comprising:
one or more processing devices; and
one or more memory devices comprising instructions that, in response to execution by one or more processing devices, cause the one or more processing devices to perform operations comprising:
receiving an input from a user, the input specifying that a media playback instruction of a media player application triggers at least one of a mode determination and a notification, where the notification is triggered even when the media playback instruction cannot be activated to alter one or more active modes of the media player application, the one or more modes including one or more of a shuffle mode, a repeat one mode, a repeat all mode, and a mute mode;
receiving an indication that affects the media player application has been activated;
identifying, by the one or more computing systems in response to the indication, one or more active modes of the media player application that are not influenced by the media playback instruction; and
providing, on a display in response to identifying the one or more active modes, a combined notification in a graphical representation that at least two of the one or more active modes are active.

* * * * *